United States Patent [19]

Arditty et al.

[11] Patent Number: 4,480,915
[45] Date of Patent: Nov. 6, 1984

[54] RING INTERFEROMETER DEVICE AND ITS APPLICATION TO THE DETECTION OF NON-RECIPROCAL EFFECTS

[75] Inventors: Hervé Arditty; Michel Papuchon; Claude Peuch, all of Paris, France

[73] Assignee: Thomson-CSF, Paris, France

[21] Appl. No.: 212,435

[22] Filed: Dec. 3, 1980

[30] Foreign Application Priority Data

Dec. 14, 1979 [FR] France ................ 79 30722

[51] Int. Cl.$^3$ .................. G01B 9/02; G01C 19/64
[52] U.S. Cl. ..................... 356/350; 356/351
[58] Field of Search ................ 356/350, 351

[56] References Cited

U.S. PATENT DOCUMENTS 4,257,707  3/1981  Liertz et al. .............. 356/73.1
4,302,107  11/1981  Schiffner et al. ............. 356/350

FOREIGN PATENT DOCUMENTS 1439416  11/1968  Fed. Rep. of Germany.
2409518  6/1979  France.
2416450  8/1979  France.

OTHER PUBLICATIONS

"Fiber-Ring Interferometer: Polarization Analysis," Ulrich et al., Optics Letters, vol. 4 #5, May 1979, pp. 152-154.

"Fiber-Optic Rotation Sensing with Low Drift," Ulrich, May 1980, Optics Letters, vol. 5, No. 5, pp. 173-175.

"Re-Entrant Fiberoptic Approach to Rotation Sensing," Arditty et al., SPIE vol. 157, Laser Inertial Rotation Sensors (1978), pp. 138-148.

"Sensitivity Analysis of the Sagna Effect Optical Fiber Ring Interferometer," Applied Optics, vol. 18, No. 6, Mar. 1979, by S. C. Lin et al., pp. 915-931, *pp. 915-916, 929*.

Primary Examiner—Vincent P. McGraw
Attorney, Agent, or Firm—Oblon, Fisher, Spivak, McClelland & Maier

[57] ABSTRACT

The invention relates to ring interferometers. It aims at making strictly reciprocal a ring interferometer of any known structure, by means of a mode filter which allow a particular mode to be selected among all the modes likely to be propagated in the loop and to arrive at the detection device; this filtering is carried out by a mode filter comprising for example a screen pierced with a hole or an integrated wave-guide or optical fiber portion which are advantageously monomode.

17 Claims, 11 Drawing Figures

RING INTERFEROMETER DEVICE AND ITS APPLICATION TO THE DETECTION OF NON-RECIPROCAL EFFECTS

BACKGROUND OF THE INVENTION

The invention relates to ring interferometers for measuring the effect of nonreciprocal phenomena such as the Faraday effect and the Sagnac effect with very great sensitivity and very great stability.

In a ring interferometer, or Sagnac interferometer, two beams travel in opposite directions over the same optical path and interfere at the exit from this path. As long as a disturbance in this path presents the same characteristics in both porpagation directions and does not vary during the transit time of the light in the interferometer, the two beams are affected identically and their relative phase remains unchanged. Disturbances of this type are called "reciprocal". Because the transit time in an interferometer is generally very small, the variations of a disturbance during this time, except if this latter is introduced voluntarily, are generally negligible.

But there exist "nonreciprocal" disturbances which have a different amplitude in the two propagation directions, these are physical effects which, by establishing its complete orientation, destroy the symmetry of the space or the medium.

Two known effects present this property:

the Faraday effect, or colinear magneto-optical effect, where a magnetic field creates a preferential orientation of the spin of the electrons of the optical material, the Sagnac effect, or relativistic inertial effect, where the rotation of the interferometer with respect to a Gallilean reference destroys the symmetry of the propagation times.

In a ring interferometer, only "nonreciprocal" disturbances of this type have an effect on the detected signal. The dimensional variations such as creep, thermal expansion, pressure variation, or the refraction index variations have not, as far as they are concerned, any effect on the detected signal. We have then, in principle, an instrument for measuring "nonreciprocal" effects which presents a perfect stability.

In practice, so that the reciprocal disturbances may have a strictly zero effect, the two beams of the interferometer must travel exactly over the same path. More precisely, the two waves must have two identical solutions of the wave equation of the interferometer, the sign of the "time" parameter being reversed.

When the interferometer is constructed for free propagation, and this is the case when using discrete optical elements, this condition is never strictly respected:

the wave equation presents a "continuum" of solutions and the least disalignment of the optical means leads to different solutions, so non-superimposed wave fronts being obtained;

even for identical solutions, when infinite extension waves are considered, plane waves for example, the intensity distribution, necessarily limited in practice, differs, in fact, were it only because of the diffraction, and disrupts the reciprocity.

A monomode type solution consists in an interferometer having an end-to-end wave-guide structure, and described in French patent application No. 77 35039, filed on Nov. 22, 1977. In this case, the wave equation presents a discrete number of solutions and it is possible, in principle, to use the same one of these solutions, or modes, in each of the two propagation directions. However, because couplings between modes are always present, it is preferable for the guide structure to be monomodal. But this solution is technologically difficult to use.

SUMMARY OF THE INVENTION

The invention provides a structure for readily ensuring conditions of strict reciprocity for an interferometer constructed furthermore in any known way. This structure forces the wave which travels through the interferometer and which is detected to be contained in a single mode.

It provides more precisely a ring interferometer device of the type comprising optical means for causing two fractions of a coherent radiation to travel in opposite directions in a closed loop, and means for detecting the interference of the two radiations after traveling through the loop, characterized in that filtering means are provided for selecting a particular mode among all the modes likely to be propagated in the loop and to arrive at the detection device.

DESCRIPTION OF THE DRAWINGS

The invention will be better understood from the description which follows, illustrated by the accompanying figures in which.

DESCRIPTION OF THE PREFERRED EMBODIMENTS

Figure 1:
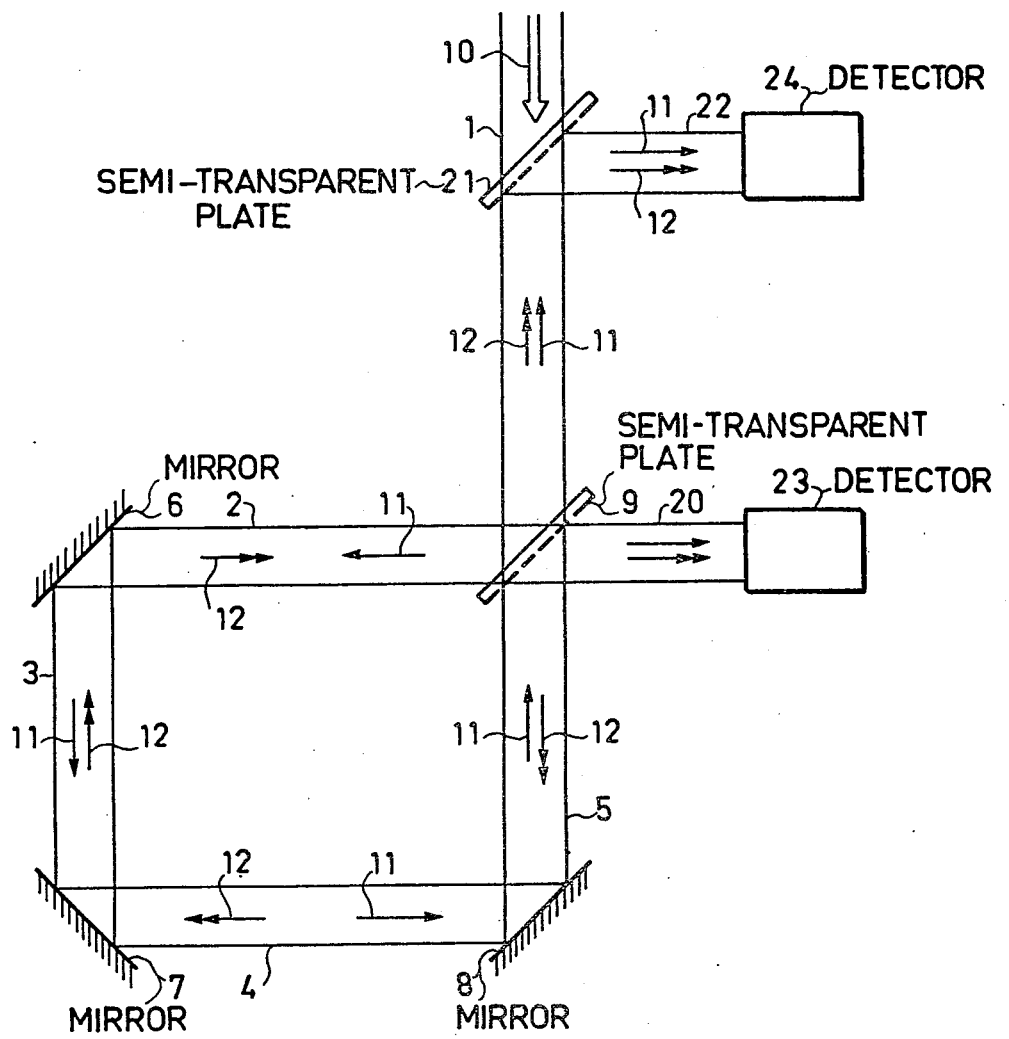
FIG. 1 is a simplified diagram of a ring interferometer of the known art.

FIG. 1 shows a simplified diagram of a ring interferometer according to the prior art.

The optical path of this interferometer is constituted by the input arm 1 and the optical ring formed here by the four rectilinear sections 2, 3, 4, 5 defined by the three reflecting mirrors 6, 7, 8. The input of the ring is materialized by the semitransparent plate 9. Incident beam 10 arrives through input arm 1 onto semitransparent plate 9. This plate reflects, into section 2, a part thereof which forms beam 11 shown by the arrows bearing this reference number. It transmits, into section 5, the other part which forms beam 12, shown similarly by arrows bearing this reference.

Beam 11 travels through the ring of the interferometer by following in order, sections 2, 3, 4, 5, whereas beam 12 travels therethrough in the opposite direction, i.e. following sections 5, 4, 3, 2. The two beams then arrive at semitransparent plate 9.

Beam 11 is partly transmitted into arm 1 of the interferometer and partly reflected into arm 20.

Beam 12 is partly reflected into arm 1 and partly transmitted into arm 20.

Two portions of these two beams interfere then in arms 1 and 20.

In the absence of nonreciprocal disturbances, in arm 20, the interference is destructive and the signal detected by detector 23 is zero, whereas in arm 1 the interference is constructive and the signal is maximum.

To extract from input arm 1 the energy to be detected, it may be separated from the incident energy for example by means of a semireflecting plate, as shown at 21 in FIG. 1. There is then detected the signal coming from the interference of one part of beams 11 and 12 in arm 22, by means of detector 24.

In practice, such an interferometer is never strictly reciprocal. For that it must have traveling therethrough a wave contained in a single optical mode. The aim of the invention is to insert a mode filter into the arm of the interferometer so as to satisfy this condition.

A mode filter is a structure having infinite losses for any wave except a particular solution. By inserting it into a light beam, the energy emitted by the source from which this beam comes is not entirely, or not exactly in the natural mode of the filter, and only the projection of this energy on this mode passes through the filter.

If such a filter is inserted in the input arm of the interferometer, the wave penetrating into the interferometer properly speaking is therefore attenuated, but contained in a single well-defined mode. After traveling through the optical loop of the interferometer and recombination by means of the separator plate, the fraction of optical energy obtained by interference of the two waves in the arm of the interferometer presents a complex mode structure. In general, the projection of this energy on the natural mode of the filter, the same as for the outward travel, is not zero: this fraction is attenuated but contained in this same single and well-defined mode. In the absence of nonlinear phenomena and, of course, in the absence of nonreciprocal phenomena the fraction of energy contained, properly speaking, during outward and inward travel, in this same mode is linearly independent of the optical energy remainder: everything happens as if this energy remainder did not exist, and the conditions of unicity of mode required and sufficient for strict reciprocity of the device are satisfied.

In fact, for most of the mode filters which can be constructed, the polarization of the wave passing through the filter is an additional degree of freedom, that is to say that in fact the filter is bimode. When the propagation constants, the intensity distributions or the losses of these two modes differ substantially, that is enough to separate them. If, on the contrary, the two modes are substantially degenerated, one of the two may be rejected by a polarizer, Nicol, Glan, polarizing film, integrated polarizer, etc...

Figure 2:
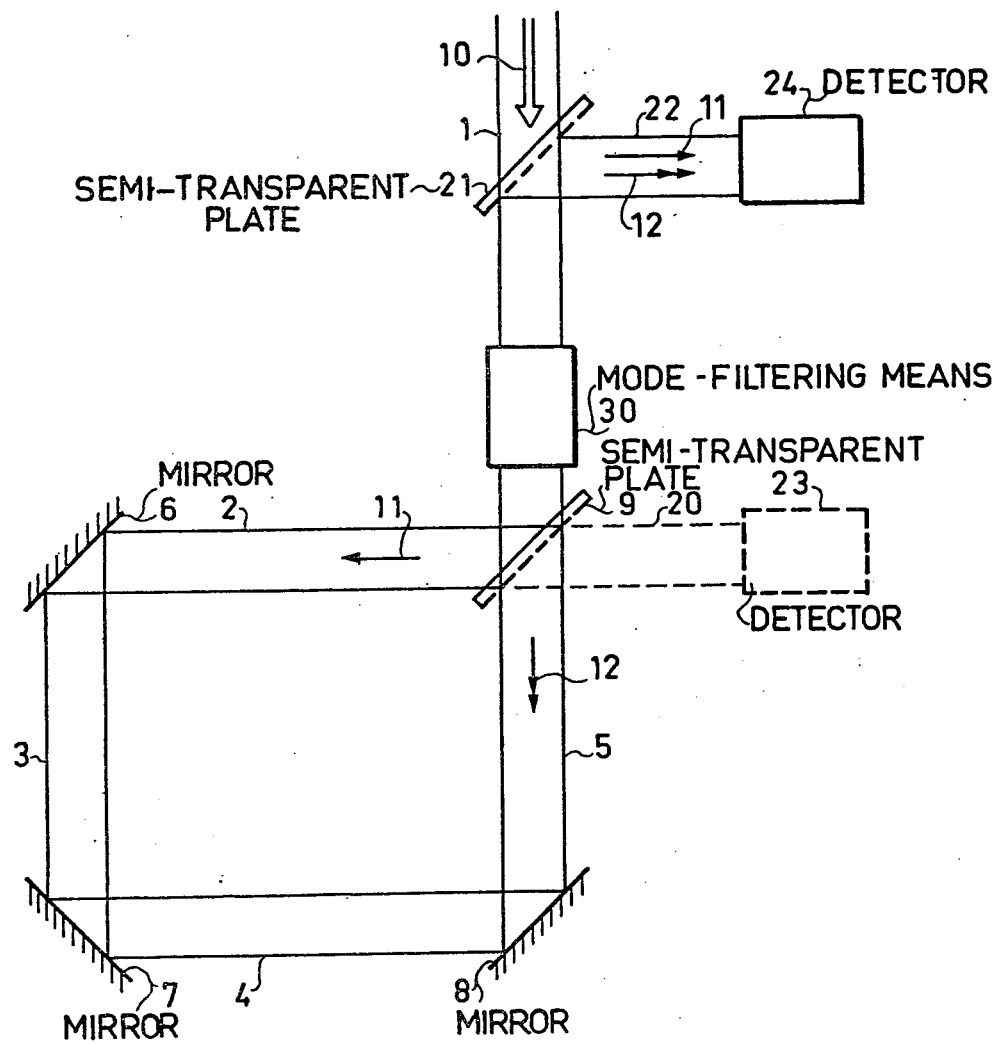
FIG. 2 is a simplified diagram of an interferometer in accordance with the invention.

FIG. 2 is a simplified diagram of a ring interferometer in accordance with the invention.

There will be recognized therein the different elements which constitute the interferometer of FIG. 1, namely input arm 1, and the optical loop formed from sections 2, 3, 4, 5, defined by mirrors 6, 7, 8. The input of the loop is materialized by the semitransparent plate 9, and the signal to be detected is extracted from the input arm and fed into arm 22 by semitransparent plate 21.

There can be seen in addition, inserted in the input arm 1, the mode-filtering device 30.

The incident beam 10 passes through this device, and the fraction which exits therefrom is contained in a single mode. This fraction reaches semitransparent plate 9 to be there separated into two beams 11 and 12 which travel through the ring in both directions. One part of the two beams is then returned to arm 1 by semitransparent plate 9 and passes again through mode-filtering device 30. At the output thereof, the two beams 11 and 12 which are fed into arm 22 by means of semitransparent plate 21 are contained in the same mode, which makes the interferometer of the invention insensitive to so-called reciprocal disturbances. The signal detected by detector 24 is then a sensitive and stable measurement of nonreciprocal phenomena.

In arm 20, there may be detected by means of detector 23, a signal corresponding to the interference of the two beams which have not passed twice through the mode-filtering device.

Several nonlimiting examples of construction of mode filters are described hereafter.

Figure 3:
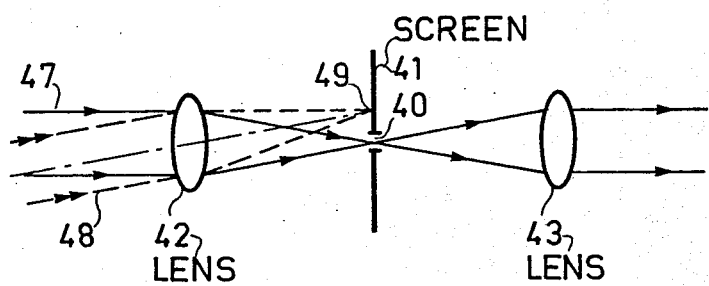
FIGS. 3 to 6 show embodiments of mode filters.

FIG. 3 shows a first embodiment of a mode filter. It is a cell formed by the association of a filtering hole 40 in an opaque screen 41 and two lenses 42 and 43. The two lenses are disposed so that their focal plane coincides with the plane of screen 41. Only the mode 47 shown with a continuous line may pass through the filter for it is focused on hole 40. Mode 48, focusing at 49, is stopped. So that attenuation is infinite outside the natural mode, the dimensions of the filtering hole must correspond to the diffraction limit and the lenses must respect this limit.

Figure 4:
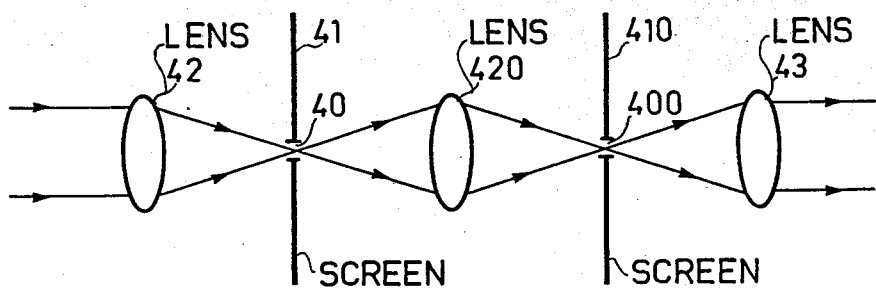

This is practically impossible to achieve. To improve the quality of the filter, several cells of this type may be associated, disposed in cascade, as shown in FIG. 4. Lens 420 is inserted between the two screens 41 and 410 pierced with holes 40 and 400 aligned on the axis of the system.

Figure 5:
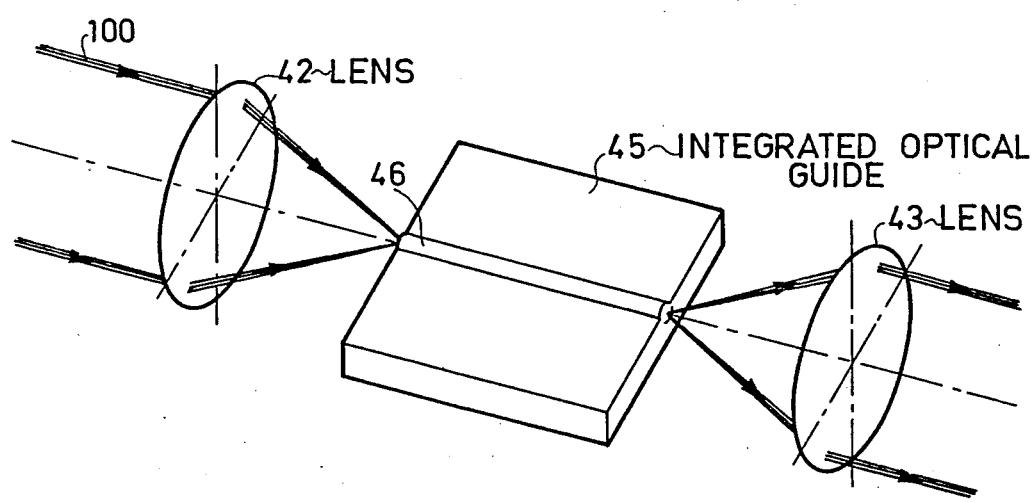

Another embodiment of a mode filter is shown in FIG. 5. This is a wave-guide 46 constructed according to integrated optics, for example by diffusion of titanium in a crystalline substrate of lithium niobate shown at 45 in FIG. 5.

This component is associated with two lenses 42 and 43, for coupling the incident and emergent radiations to the guide.

Lens 42 focuses the incident beam 100 on the inlet of guide 46 defined in the substrate and lens 43 recovers the exiting beam to make a parallel beam therefrom.

The construction of a monomode integrated waveguide is known which avoids the use of polarizers.

Figure 6:
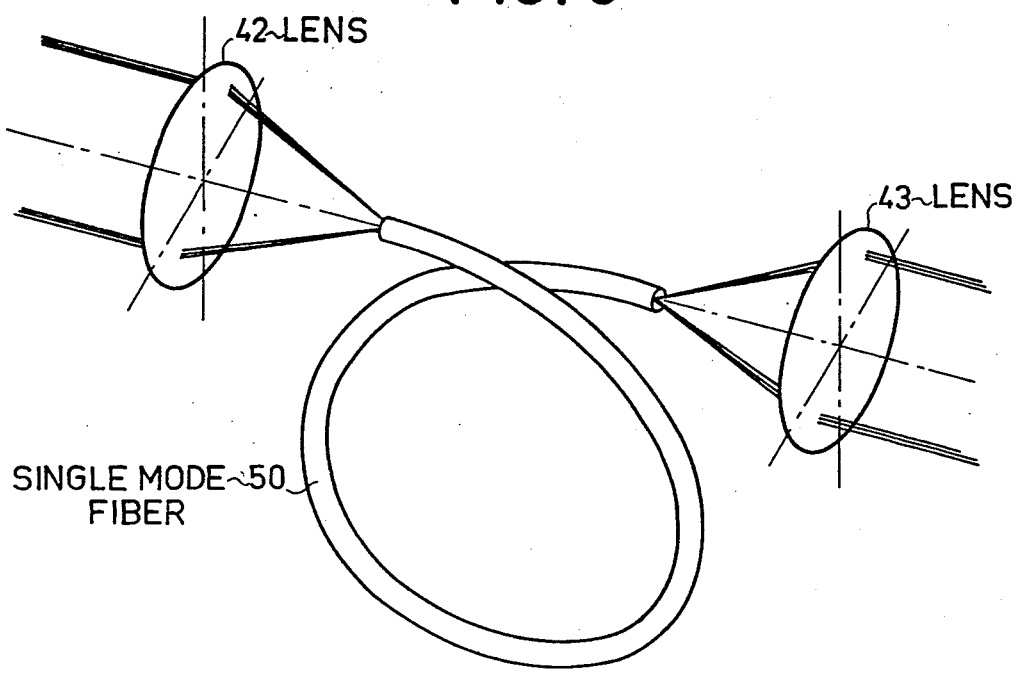

FIG. 6 shows a third type of mode filter. It is constructed from an optical fiber 50 coupled by two lenses 42 and 43.

In this case, it is known how to construct a strictly monomode optical fiber, by acting on different parameters, such as the shape of the section of the fiber, the stress to which it is subjected, or the imposed coiling whose radius of curvature corresponds to the transmission of a single mode. A monomode optical fiber of a few centimeters represents an almost perfect mode filter.

Figure 7:
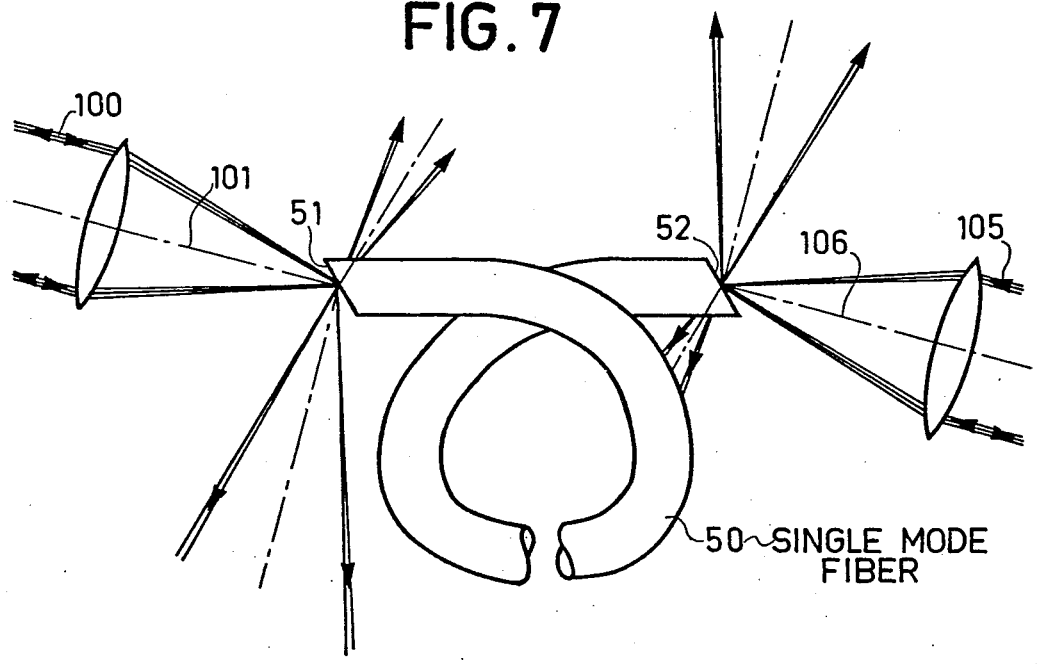
FIG. 7 is an advantageous arrangement of a mode filter with respect to the beam.

It is however desirable to take a few precautions in positioning the fiber with respect to the axis of the beam so as to avoid reflections of energy towards the optical coupling elements. It is advantageous for the ends which each play the role of entrance, either in the outgoing, or in the return direction of the beam, to form an angle which is not a right-angle with the axis of propagation. This arrangement has been shown in FIG. 7.

Input face 51 of fiber 50 makes an angle which is not a right-angle with the axis 101 of incident beam 100. The same is true of output face 52, which plays the role of input on return of the beam. It makes an angle which is not a right-angle with the axis 106 of the emerging beam 105.

It is advantageous to use the same precautions in the case of an integrated filter.

Figure 8:
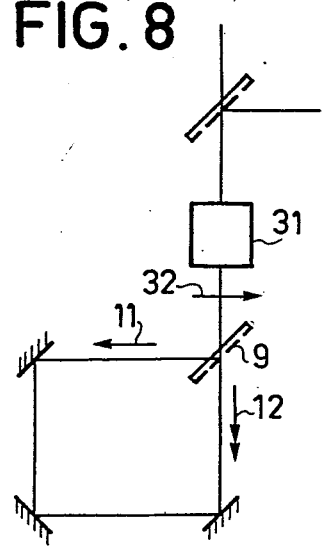
FIGS. 8 to 10 show schematically variations of the arrangement of different elements in the interferometer of the invention.
Figure 9:
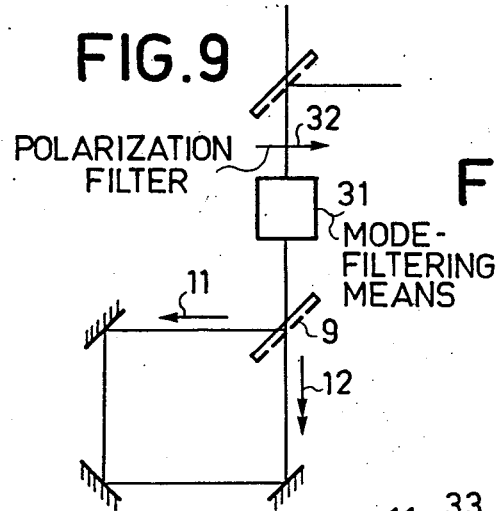
Figure 10:
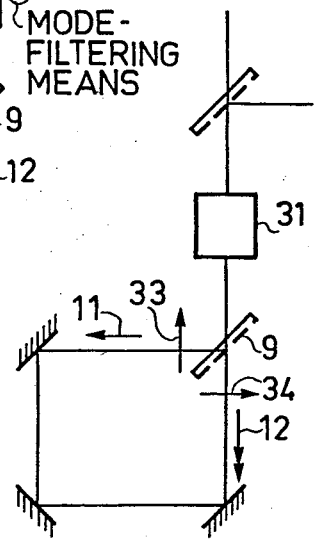

In the very general case where the filter is in fact bimode, and where it is necessary to use at least one polarizer to make it perfectly monomode, different configurations may be used, equivalent from the operational point of view, as shown in FIGS. 8 to 10.

In FIG. 8, the polarizer 32 is placed after the bimode filter 31, before the semitransparent plate 9. Polarizer 32 may be placed, as shown in FIG. 9, just in front of the bimode filter 31.

The configuration shown in FIG. 10 uses two polarizers. One 33 is placed in section 2 of the ring of the interferometer, just after semitransparent plate 9. The other 33 is placed in section 5, also at the side of plate 9. Beams 11 and 12 thus pass through both polarizers.

Figure 11:
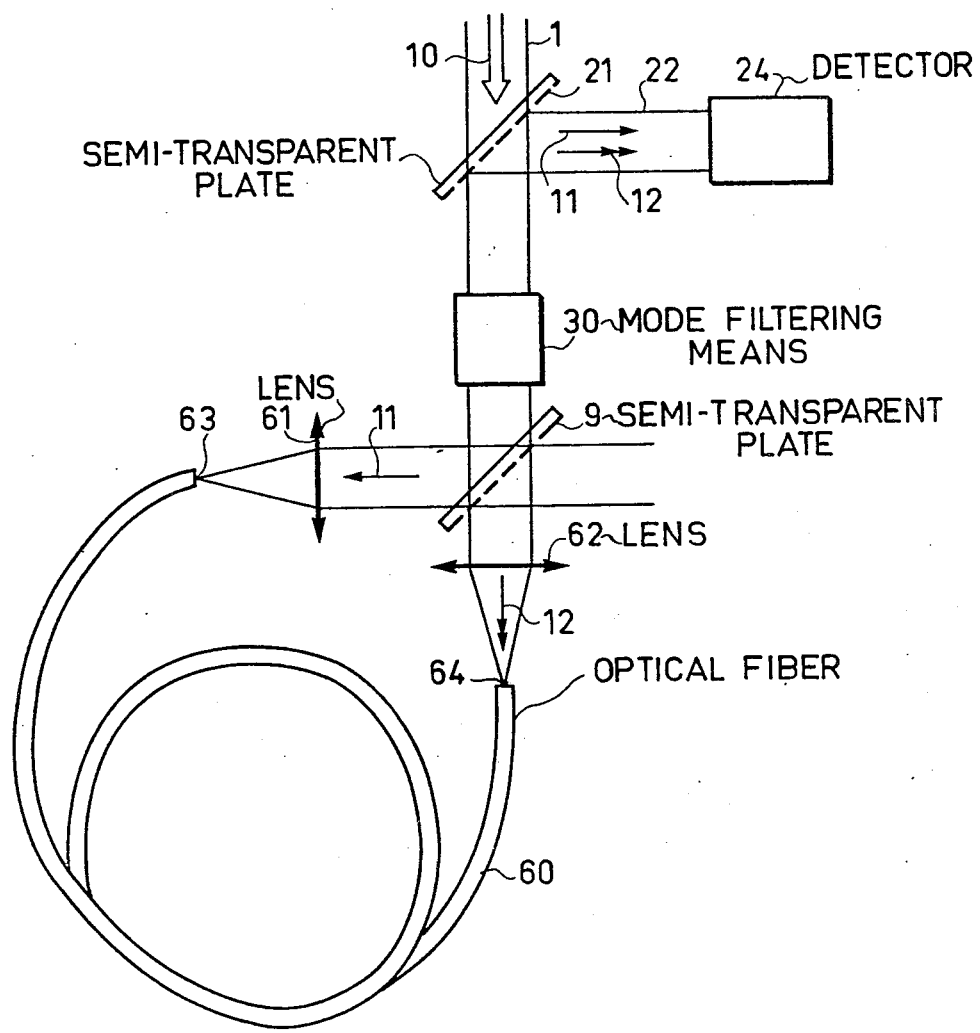
FIG. 11 is an example of a ring interferometer according to the invention.

FIG. 11 shows a ring interferometer whose path is formed from a monomode optical fiber, but the core of which is formed from conventional optical elements. The addition of the mode filter makes such an interferometer strictly reciprocal.

The incident beam 10 passes through mode filter 30 and separates into two at the semitransparent plate 9. A part of the beam is sent into optical fiber 60 through lens 61 which focuses it on the input 63 of the fiber, whereas the other part of the beam is fed to this same fiber 60 through lens 62 which focuses it on the input 64 of this fiber. The two beams travel through the fiber in reverse directions and are returned to the arm of the interferometer by semitransparent plate 9. They pass again through mode filter 30 and are separated from the incident beam by the semitransparent plate 21 which feeds them partly into arm 22 in which the interference signal is detected by detector 24.

The stability of a ring interferometer which uses the devices described is only limited by the quantum noise of the light. It becomes possible to measure the effect of nonreciprocal phenomena with very high sensitivity, for example $10^{-8}$ fringe. If the arrangement indicated is not used, the dimensional stability required for the stable observation of a phase shift of $10^{-8}$ fringe is of the order of $10^{-14}$ m, impossible to obtain in practice.

What is claimed is:

1. A ring interferometer device comprising:
   a closed optical loop;
   means coupled to said optical loop for splitting a coherent optical radiation into two fractions which travel in opposite directions in the closed loop;
   an optical path for transmitting the coherent optical radiation to the splitting means;
   filtering means disposed in said optical path for selecting a single one predetermined mode for transmission therethrough;
   detector means coupled to said optical path for detecting the interference of the two fractions of radiation traveling in opposite direction in said closed loop;
   means for coupling said detector means to said optical path; and
   said filtering means disposed between said coupling means and said splitting means such that the coherent radiation passes through said filtering means in opposite directions during travel to said closed loop and from said closed loop to said detector means.

2. The device as claimed in claim 1, wherein the filtering means comprises a mode filter transmitting only one mode.

3. The device as claimed in claim 1, comprising:
   polarizing means for passing a selected polarization of said radiation.

4. The device as claimed in claim 3, wherein the polarizing means are situated upstream of the splitting means.

5. The device as claimed in claim 3, wherein the polarizing means are situated inside the loop.

6. The device as claimed in claim 2, wherein the filtering means comprises:
   at least one cell including lenses having a common focal plane in which there is situated a spatial filter for isolating said predetermined mode.

7. The device as claimed in claim 6, comprising:
   plural of said cells, each including said lenses and said spatial filter disposed in cascade.

8. The device as claimed in claim 2, wherein the filtering means comprises:
   at least one wave-guide portion integrated on a substrate, and
   optical means for coupling the incident and emergent optical radiation at the ends of the wave-guide portion.

9. The device as claimed in claim 8, wherein the integrated wave-guide portion is a monomode wave-guide portion.

10. The device as claimed in claim 2, wherein the filtering means comprises:
    a wave-guide comprising at least one optical fiber portion, and
    optical means for coupling the incident and emergent optical radiations at the ends of the optical fiber portion.

11. The device as claimed in claim 10, wherein the optical fiber portion is a monomode optical fiber portion.

12. The device as claimed in claim 8, comprising:
    said wave-guide portion having faces orientated with respect to the directions of propagation of the radiation so that the energy reflected by these faces falls outside the optical coupling means.

13. The device as claimed in claim 1, wherein the closed optical loop of the interferometer comprises mirrors.

14. The device as claimed in claim 1, wherein the closed optical loop comprises an optical fiber.

15. A gyrometer comprising an interferometer device as claimed in claim 1.

16. A measuring device responsive to a magnetic field, comprising an interferometer device as claimed in claim 1.

17. The device as claimed in claim 10, comprising:
    said at least one optical fiber portion having faces oriented with respect to the directions of propagation of the radiation so that the energy reflected by these faces falls outside the optical coupling means.

* * * * *